United States Patent Office 2,901,372
Patented Aug. 25, 1959

2,901,372

STRIP-RESISTANT BITUMINOUS COMPOSITIONS

Jack N. Dybalski and Paul L. Du Brow, Chicago, Ill., assignors to Armour and Company, Chicago, Ill., a corporation of Illinois No Drawing. Application September 21, 1956
Serial No. 611,415

20 Claims. (Cl. 106—273)

This invention relates to the problem of securing a satisfactory bond between bituminous compositions and the various surfaces to which they are applied in industrial operations. In one of its aspects, this invention relates to heat-stable bitumen additives which when added in small proportions materially improve the bond between bituminous compositions and the surfaces to which they are applied, whether the surfaces are acid or alkaline in nature. In another of its aspects, this invention relates to bituminous compositions including small proportions of these heat-stable additive agents.

When a bituminous substance such as asphalt in molten, cutback or emulsified form is applied to such hydrophilic surfaces as those of mineral aggregates in road building, concrete walls in water-proofing, paper in water-proofing, etc., it is difficult to secure prompt coating of the surfaces by the bituminous material. Further, it is difficult to prevent the stripping or removal of such bituminous coatings from such surfaces with time. Although prevention of stripping is the more important consideration, ease of application is frequently of material importance.

Where the surface is moist, damp or actually soaked, the problem is obviously intensified because the bitumen must not only coat the surface but it must first dislodge a tenaciously held water film. Some aggregates such as river gravels when freshly dredged come to the job saturated with water. Rainstorms occurring during construction also produce soaked surfaces and promote stripping. Sometimes the materials coated are porous and retain considerable moisture in the interstices after the outer surfaces seem reasonably dry.

In some cases, it has been necessary first to dry the surface before applying the bituminous coating. Roadways laid in wet weather deteriorate rapidly in use. Where a bituminous roadway is subjected to water, as in low-lying areas or areas where water run-off is frequent or constant, it soon disintegrates with the development of holes. The aggregate used in its construction is easily broken down to individual pebbles or small clumps of pebbles under such conditions in the absence of some corrective or preventive procedure, such as drying the aggregate by heat before use.

In road construction use, bituminous compositions are employed in conjunction with various mineral materials, sometimes mineral materials like slags, but more generally of natural origin, such as sand, rock, etc. It is obvious that the potentially useful aggregates include all of the various kinds of rocks native to the localities where roads are to be built. For example, limestone, dolomite, silica, rhyolite, caliche, and sedimentary, metamorphic, or igneous rocks of various other kinds are regularly used in road building. Such mineral aggregates are hydrophilic in character, a fact that is generally considered to be principally responsible for the existence of the bitumen-stripping problem.

In general, road construction is administered by the Departments of Highways or Public Works Departments of the various states and municipalities, and these administrative agencies, aware of the problem of stripping, have set up specifications which asphalt additives must meet or exceed before they can be adopted for use. Usually, these specifications are based upon tests employing mineral aggregates which are native to the state or municipality in which the road is being constructed. As would be expected, the testing procedures as well as the aggregates vary from place to place. However, many of the procedures now provide that the asphalt containing the additive be subjected to a high temperature for a given period of time. This is for the purpose of simulating the actual conditions under which the additive-containing asphalt is employed. That is, due to high labor costs, the trend has been toward holding or storing the asphalt at high temperatures in a liquid state so that it is readily available for use. If the additive chemical is adversely affected by temperature, as many of the prior art asphalt additives are, its ability to impart strip-resistant properties to the asphalt is impaired.

In the past, the practice has been to provide a number of different asphalt additives each more or less tailored to the various States' tests. To our knowledge, no one has ever provided a single type of asphalt additive which is both heat-stable and capable of providing a strip-resistant bituminous composition which can be applied to a mineral surface which is either acid or alkaline in nature.

It is, therefore, an object of the present invention to provide heat-stable bitumen additives which when added in small proportions materially improve the bond between bituminous compositions and the surfaces to which they are applied, whether the surfaces are acid or alkaline in nature.

It is a further object of the present invention to provide improved strip-resistant bituminous compositions including small proportions of these heat-stable additives.

Further and additional objects of this invention will become apparent as the specification proceeds.

In accordance with the present invention, we have provided a heat-stable anti-strip additive for bituminous compositions comprised of amine salts which are prepared by mixing between 1 and 2 molar equivalents of a particular type of sulfonic acid with 1 molar equivalent of a particular type of diamine represented by the general formula

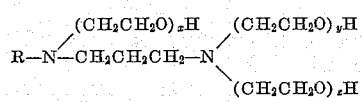

wherein R is an aliphatic hydrocarbon radical having between 8 and 22 carbon atoms and $x$, $y$, and $z$ are integers the sum of which is between 2 and 10. The basic diamines are prepared by initially reacting a long-chain primary amine with acrylonitrile followed by reduction of the nitrile group to an amine. This results in the formation of a N-aliphatic trimethylenediamine which is then condensed with from 2 to 10 mols of ethylene oxide to produce the basic diamine compound illustrated. In the preferred diamine base, $x$, $y$, and $z$ are each 1.

Examples of hydrocarbon radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, and mixtures of hydrocarbon radicals as contained in tallow, soybean oil, coconut oil, cottonseed oil, tall oil, rosin, etc. In the preferred compounds, R is a mixture of hydrocarbon radicals as contained in tallow, coconut oil or soybean oil. The preferred N-aliphatic trimethylenediamines used in forming the basic component of the salt are mixtures of diamines derived from naturally-occurring fats and oils, such as soybean oil, coconut oil, tallow, and the like. Examples of preferred diamine mixtures are N-tallow trimethylene diamine (derived from tallow and in which "tallow" comprises a mixture of the following aliphatic radicals: dodecyl, tetradecyl, tetradecenyl, hexadecyl, hexadecenyl, octadecyl, octadecenyl, octadecadienyl, eicosyl, and eicosenyl); N-coco trimethylene diamine (derived from coconut oil and in which "coco" comprises a mixture of octyl, decyl, dodecyl, tetradecyl, hexadecyl, octadecyl, otadecenyl, and octadecadienyl radicals); and N-soya trimethylene diamine (derived from soybean oil and in which "soya" comprises a mixture of hexadecyl, octadecyl, octadecenyl, and octadecadienyl radicals). Hereinafter, the terms "tallow," "coco" and "soya" are meant to refer to the respective mixtures of radicals set forth. Principally from an economic standpoint, R is a mixture of hydrocarbon radicals as contained in tallow.

The acids which can be used in forming the amine salts of the present invention include alkylaryl sulfonic acid having an alkyl group containing between 6 and 18 carbon atoms and alkane sulfonic acids having 1 to 4 carbon atoms. These acids are well-known commercial products. The alkylaryl sulfonic acids are most often employed in the form of their sodium salts as active ingredients in detergent compositions. The alkylaryl sulfonic acids can be made by several different methods. One common method is to alkylate an aromatic compound such as benzene, naphthalene, toluene, xylene, or the like, with a chlorinated kerosene fraction having hydrocarbons containing between 6 and 18 carbon atoms in the molecule, using a Friedel-Crafts type of reaction and an aluminum chloride catalyst. The resulting alkylaryl compound is then sulfonated using sulfuric acid, oleum, or the like. Alkyl benzene sulfonic acids are the preferred acids of this type and particularly dodecyl benzene sulfonic acid.

The alkane sulfonic acids containing from 1 to 4 carbon atoms commercially available are prepared by the oxidation of the corresponding alkyl disulfides or mercaptans with air or oxygen in the presence of nitric acid or nitrogen oxide catalysts. Direct sulfonation of the corresponding hydrocarbons can be used but the yields are poor and the method is not practical. Examples of these sulfonic acids include methane, ethane, propane and butane sulfonic acids. A preferred acid of this type is composed of an equal part mixture of methane, ethane and propane sulfonic acids.

In preparing our improved bitumen additives, between 1 and 2 molar equivalents of the particular sulfonic acid are simply mixed with 1 molar equivalent of the particular diamine base to give a product which will vary in pH between about 4.5 and 9, depending upon the amount of acid employed. When 1 molar equivalent of acid is used, the product tends to be on the alkaline side, whereas when 2 molar equivalents of acid are employed, the product tends to be slightly acid.

We have discovered that in the employment of our bitumen additives, there is a general inverse relationship between the acidity or alkalinity of the mineral surface to which the bituminous composition is applied and the pH of the additive employed. Thus, for an alkaline mineral such as limestone having a pH of about 8.5, the additive which gives the best result is one which tends toward the acid side or one which contains a higher percentage of diacid salt as opposed to monoacid salt. On the other hand, when applying a bituminous composition to an acid-type of mineral, such as rhyolite, an additive which tends to be on the alkaline side, that is containing more of the monoacid salt, gives a better result. In between the two extremes we have found that there is a blend of the monoacid and diacid salts which can be employed satisfactorily for either or any type of aggregate surface. This blend is prepared by mixing between about 1.3 and about 1.6 moles of the sulfonic acid with 1 mole of the diamine base. A preferred blend is one which is produced by mixing together about 1.5 moles of the acid with 1 mole of the diamine base. When the diamine base is N-tallow-N,N', N'-tris (hydroxyethyl)trimethylenediamine having an average molecular weight of 532 and the acid is dodecyl benzene sulfonic acid having a molecular weight of approximately 260, the preferred blend will contain about 25 weight percent of the monoacid salt and about 75 weight percent of the diacid salt and have a pH of about 6.5 to 7.5.

Our improved asphalt additives can be employed either as pure materials or in the form of concentrates or solutions either in a suitable organic solvent, such as kerosene, naphtha, benzene, or the like, or even a cutback or penetration grade asphalt. The additives, either as the pure material or as a concentrate, are preferably mixed with the bitumen before it is used for coating purposes, and a concentration range, based upon the bitumen coating composition, varying between 0.05 and 2.5 weight percent. Preferably, between 0.2 and 0.85 weight percent of additive is employed.

Our improved bituminous compositions can be prepared by heating the bituminous coating material to a temperature at which its viscosity is relatively low and then mixing in the desired proportion of additive agent. Thorough mixing of the ingredients can be achieved by rolling with gas, recycling through a mixing tank with mixing-type pumps, or by stirring with a propeller or other tank-type stirrer. The bituminous mixture so prepared can be delivered to the job ready for use in any desired method of application. This can be, for example, direct application by spraying it on already laid aggregate; application to a continuous road mixing unit; or addition to a hot-mix plant. The additive-bitumen mixture can be sprayed or poured for seal-coat application in the conventional manner. The presence of the additive does not adversely affect the useful properties of the asphalt and in fact improves its ease of application. The bituminous coating material can be handled exactly as if no reagent had been added.

Where the additive is to be incorporated in an emulsified bituminous composition, it can be added to the bitumen ingredient in the manner just described; or it can be added to the finished emulsion by simply stirring it in the desired proportion in any conventional manner.

Within the term "bitumen" we mean to include natural asphalt, petroleum still residues of paving grade, plastic residues from coal tar distillation, petroleum pitch, solutions of such substances like cutback asphalts, emulsions thereof, and the like.

The following test results will help to illustrate the underlying principles of the present invention.

TABLE I

State of Massachusetts heat stability and stripping tests

| Additive | Wt. Percent Additive | Type of Asphalt | Type of Aggregate | Percent Coated | Percent Strip 24 Hours |
|---|---|---|---|---|---|
| A | 0.5 | RC-2 | Rhyolite | 100 | 2 |
| B | 0.5 | RC-2 | 50% Limestone / 50% Silica gravel | 100 | 3 |
| C | 0.5 | RC-2 | Limestone | 100 | 2 |
| D | 0.5 | RC-2 | Rhyolite | 100 | 8 |
| E | 0.5 | RC-2 | 50% Limestone / 50% Silica gravel | 100 | 8 |
| F | 0.5 | RC-2 | Limestone | 100 | 2 |

Additive A has a pH in the range of 8.5 to 9 and is the reaction product of 1 mole of N-tallow-N,N',N'-tris (hydroxyethyl) trimethylene diamine with 1 mole of commercial dodecyl benzene sulfonic acid. This product contains 68.3% by weight of the diamine and 31.7% by weight of the sulfonic acid.

Additive B has a pH in the range of 7 to 7.5 and is the reaction product of 1 mole of N-tallow-N,N′,N′-tris(hydroxyethyl)trimethylene diamine with 1.5 moles of commercial dodecyl benzene sulfonic acid. This product contains 59.0% by weight of the diamine and 41.0% by weight of the sulfonic acid.

Additive C has a pH is the range of 5 to 5.5 and is the reaction product of 1 mole of N-tallow-N,N′,N′-tris(hydroxyethyl)trimethylene diamine with 2 moles of commercial dodecyl benzene sulfonic acid. This product contains 51.9% by weight of the diamine and 48.1% by weight of the sulfonic acid.

Additive D has a pH in the range of 8.5 to 9 and is the reaction product of 1 mole of N-tallow-N,N′,N′-tris(hydroxyethyl)trimethylene diamine with 1 mole of a mixture of equal parts by weight of methane, ethane and propane sulfonic acids. This product contains 83.6% by weight of the diamine and 16.4% by weight of the sulfonic acids.

Additive E has a pH in the range of 7 to 7.5 and is the reaction product of 1 mole of N-tallow-N,N′,N′-tris(hydroxyethyl)trimethylene diamine with 1.5 moles of a mixture of equal parts by weight of methane, ethane and propane sulfonic acids. This product contains 77.3% by weight of the diamine and 22.7% by weight of the sulfonic acids.

Additive F has a pH in the range of 5 to 5.5 and is the reaction product of 1 mole of N-tallow-N,N′,N-tris(hydroxyethyl)trimethylene diamine with 2 moles of a mixture of equal parts by weight of methane, ethane and propane sulfonic acids. This product contains 71.8% by weight of the diamine and 28.2% by weight of the sulfonic acids.

The molecular combining weights of N-tallow-N,N′,N′-tris (hydroxyethyl)trimethylene diamine, commercial dodecyl benzene sulfonic acid, and the mixture of equal parts by weight of methane, ethane and propane sulfonic acids as determined by titration were 561, 260 and 110, respectively. The commercial dodecyl benzene sulfonic acid, having a theoretical molecular weight of approximately 325, contains small amounts of free sulfuric acid which tends to lower the combining molecular weight considerably. The molecular weights used in formulating the salts were determined by appropriate titration. This method purposely included an free low molecular weight acids present in the reaction in order that the proper pH balance could be maintained.

While this invention has been described and exemplified in terms of its preferred embodiments, those skilled in the art will appreciate that modifications can be made without departing from the spirit and scope of the invention.

*State of Massachusetts*

*Department of Public Works*

*March 1955*

STATE HIGHWAY ANTI-STRIPPING TEST (1) Heat stability test:
   A. The additives shall be blended into 85–120 penetration asphalt at a temperature of 200–250° F. The resultant blend shall be poured into a round half-pint paint can, a tight seal friction top cover.
   B. Prepare a control sample of untreated asphalt cement in the same manner as above.
   C. Place the covers on the half-pint cans so that they are tightly sealed and placed each inside of a one-quart round friction top paint can.
   D. Punch a hole in the covers of the quart cans to act as an air vent and place cover securely on the quart containers.
   E. Place the double container arrangement into an oven maintained at 350° F. for 24 hours. Remove and cool to approximately 200° F.
   F. Prepare RC-2 cutback by diluting 75 parts of each sample with 25 parts of Varnish Makers' and Painters' Naphtha. Blend until a homogeneous mixture is obtained.

(2) Materials:
   A. Aggregate—rhyolite stone-washed with distilled water and dried in an oven at 270–300° F.
   B. Distilled water 6.0–7.0 pH.

(3) Stripping test:
   A. Weigh 100 grams of dry aggregate into an 8 gram tin container. Add 2 grams of distilled water and mix until all the aggregate is thoroughly wet.
   B. Add 6 grams of the prepared RC-2 cut-back and mix thoroughly for five minutes. Visually inspect mixture to rate the ability of the prepared cut-back to coat wet aggregate.
   C. Air cure coated aggregate for one hour at room temperature.
   D. Immerse aggregate in distilled water for 24 hours at room temperature.
   E. Visually inspect mixture while still immersed to determine per cent of aggregate coated.
   F. Treated bitumen shall be required to coat wet aggregate and to retain at least 90% of the coating after 24 hours' static immersion.

We claim:

1. A strip-resistant bituminous composition comprising a bitumen and from 0.05 to 2.5 weight percent of an amine salt formed by mixing together between 1 and 2 molar equivalents of a sulfonic acid selected from the group consisting of alkylaryl sulfonic acids having between 6 and 18 carbon atoms in the alkyl radical thereof and alkyl sulfonic acids having from 1 to 4 carbon atoms, and 1 molar equivalent of a diamine having the general formula

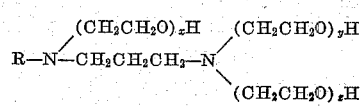

wherein R is an aliphatic hydrocarbon radical having from 8 to 22 carbon atoms, and $x$, $y$, and $z$ are integers the sum of which is from 2 to 10.

2. A strip-resistant bituminous composition according to claim 1 wherein the bitumen is an asphalt and contains from 0.2 to 0.85 weight percent of the amine salt additive.

3. A strip-resistant bituminous composition comprising an asphalt and from 0.05 to 2.5 weight percent of an amine salt formed by mixing together between 1 and 2 molar equivalents of a sulfonic acid selected from the group consisting of alkylaryl sulfonic acids having between 6 and 18 carbon atoms in the alkyl radical thereof and alkyl sulfonic acids having from 1 to 4 carbon atoms, and 1 molar equivalent of a diamine having the formula

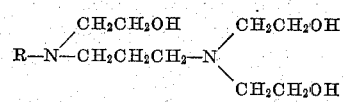

wherein R is an aliphatic hydrocarbon radical having from 8 to 22 carbon atoms.

4. A strip-resistant bituminous composition for application to mineral surfaces of both acid and alkaline natures comprising an asphalt and from 0.05 to 2.5 weight percent of an amine salt formed by mixing together between about 1.3 and 1.6 molar equivalents of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of N-tallow-N,N′,N′-tris(hydroxyethyl)trimethylene diamine.

5. A strip-resistant bituminous composition for application to mineral surfaces of both acid and alkaline natures comprising an asphalt and from 0.2 to 0.85 weight percent of an amine salt formed by mixing together between about 1.3 and 1.6 molar equivalents of a sulfonic acid selected from the group consisting of alkylaryl sulfonic acids having from 6 to 18 carbon atoms in the alkyl radical thereof and alkyl sulfonic acids having 1 to 4 carbon atoms, with 1 molar equivalent of a diamine having the formula

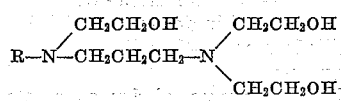

wherein R is an aliphatic hydrocarbon radical having from 8 to 22 carbon atoms.

6. A strip-resistant bituminous composition for application to mineral surfaces having an alkaline nature comprising an asphalt and from 0.2 to 0.85 weight percent of an amine salt formed by mixing together between about 1.7 and 2 molar equivalents of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the formula

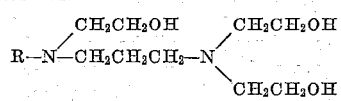

wherein R is an aliphatic hydrocarbon radical having from 8 to 22 carbon atoms.

7. A strip-resistant bituminous composition for application to mineral surfaces having an acid nature comprising an asphalt and from 0.2 to 0.85 weight percent of an amine salt formed by mixing together 1 molar equivalent of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the formula

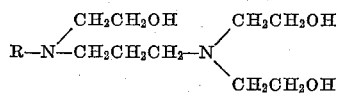

wherein R is an aliphatic hydrocarbon radical having from 8 to 22 carbon atoms.

8. A strip-resistant bituminous composition according to claim 5 wherein the sulfonic acid is a mixture of equal parts by weight of methyl, ethyl and propane sulfonic acids and R is a mixture of hydrocarbon radicals as contained in tallow.

9. A strip-resistant bituminous composition according to claim 6 wherein the sulfonic acid is a mixture of equal parts by weight of methyl, ethyl and propane sulfonic acids and R is a mixture of hydrocarbon radicals as contained in tallow.

10. A strip-resistant bituminous composition according to claim 7 wherein the sulfonic acid is a mixture of equal parts by weight of methyl, ethyl and propane sulfonic acids and R is a mixture of hydrocarbon radicals as contained in tallow.

11. A method for preventing the stripping of a bituminous composition from the mineral surface to which it has been applied comprising the step of mixing with said bituminous composition from 0.05 to 2.5 weight percent, based upon the coating bitumen, of an amine salt formed by mixing together between 1 and 2 molar equivalents of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the general formula

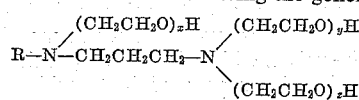

wherein R is an aliphatic hydrocarbon radical having from 8 to 22 carbon atoms and $x$, $y$, and $z$ are integers the sum of which is from 2 to 10.

12. A method according to claim 11 wherein $x$, $y$, and $z$ are each 1.

13. A process for preventing the stripping of a bituminous composition from a plurality of mineral surfaces to which it has been applied, said mineral surfaces having both acid and alkaline natures, comprising the step of mixing with said bituminous composition about 0.2 to 0.85 weight percent, based upon the coating bitumen, of an amine salt formed by mixing together between about 1.3 and 1.6 molar equivalents of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the general formula

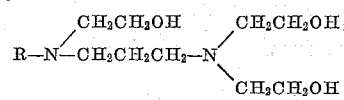

wherein R is an aliphatic hydrocarbon radical having from 8 to 22 carbon atoms.

14. A process for preventing the stripping of a bituminous composition from a mineral surface of an alkaline nature to which it has been applied comprising the step of mixing with said bituminous composition from 0.2 to 0.85 weight percent, based upon the coating bitumen, of an amine salt formed by mixing together between about 1.7 to 2 molar equivalents of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the formula

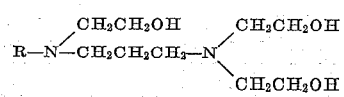

wherein R is an aliphatic hydrocarbon radical having from 8 to 22 carbon atoms.

15. A process for preventing the stripping of a bituminous composition from a mineral surface having an acid nature to which it has been applied comprising the step of mixing with said bituminous composition about 0.2 to 0.85 weight percent, based upon the coating bitumen, of an amine salt formed by mixing together about 1 molar equivalent of a sulfonic acid selected from the group consisting of alkylaryl sulfonic acids having from 6 to 18 carbon atoms in the alkyl radical thereof and alkyl sulfonic acids having from 1 to 4 carbon atoms, with 1 molar equivalent of a diamine having the formula

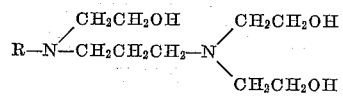

wherein R is an aliphatic hydrocarbon radical having from 8 to 22 carbon atoms.

16. A process according to claim 13 wherein the sulfonic acid is dodecyl benzene sulfonic acid and R is a mixture of hydrocarbon radicals as contained in tallow.

17. A process according to claim 13 wherein the sulfonic acid is a mixture of equal parts by weight of methane, ethane and propane sulfonic acids and R is a mixture of hydrocarbon radicals as contained in tallow.

18. A strip-resistant bituminous composition for application to mineral surfaces of both acid and alkaline natures comprising an asphalt and from 0.2 to 0.85 weight percent of an amine salt formed by mixing together between about 1.3 and 1.6 molar equivalents of a dodecyl benzene sulfonic acid with 1 molar equivalent of a diamine having the formula

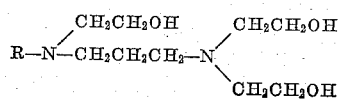

wherein R is a mixture of hydrocarbon radicals as contained in tallow and having from 8 to 22 carbon atoms.

19. A strip-resistant bituminous composition for application to mineral surfaces having an alkaline nature comprising an asphalt and from 0.2 to 0.85 weight percent of an amine salt formed by mixing together between about 1.7 and 2 molar equivalents of dodecyl benzene sulfonic acid with 1 molar equivalent of a diamine having the formula

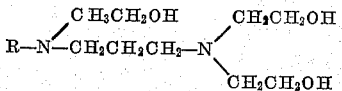

wherein R is a mixture of aliphatic hydrocarbon radicals as contained in tallow and having from 8 to 22 carbon atoms.

20. A strip-resistant bituminous composition for application to mineral surfaces having an acid nature comprising an asphalt and from 0.2 to 0.85 weight percent of an amine salt formed by mixing together 1 molar equivalent of dodecyl benzene sulfonic acid with 1 molar equivalent of a diamine having the formula

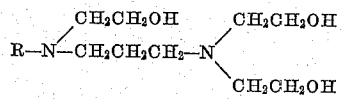

wherein R is a mixture of aliphatic hydrocarbon radicals as contained in tallow and having from 8 to 22 carbon atoms.

References Cited in the file of this patent
UNITED STATES PATENTS 2,270,681     De Groote _____ Jan. 20, 1942